(12) United States Patent
Drachmann Haag (10) Patent No.: US 11,092,133 B2
(45) Date of Patent: Aug. 17, 2021

(54) WIND TURBINE BLADE HAVING AN EROSION SHIELD

(71) Applicant: LM WP PATENT HOLDING A/S, Kolding (DK)

(72) Inventor: Michael Drachmann Haag, Esbjerg (DK)

(73) Assignee: LM WP PATENT HOLDING A/S, Kolding (DK)

( * ) Notice: Subject to any disclaimer, the term of this patent is extended or adjusted under 35 U.S.C. 154(b) by 130 days.

(21) Appl. No.: 15/745,288

(22) PCT Filed: Jul. 17, 2015

(86) PCT No.: PCT/EP2015/066397
§ 371 (c)(1),
(2) Date: Jan. 16, 2018

(87) PCT Pub. No.: WO2017/012632
PCT Pub. Date: Jan. 26, 2017

(65) Prior Publication Data
US 2018/0209400 A1    Jul. 26, 2018

(51) Int. Cl.
*F03D 1/06* (2006.01)
*F03D 80/50* (2016.01)
(Continued)

(52) U.S. Cl.
CPC ............ *F03D 1/0675* (2013.01); *B32B 5/02* (2013.01); *B32B 27/08* (2013.01); *B32B 27/12* (2013.01);
(Continued)

(58) Field of Classification Search
CPC ......... F03D 1/0675; F03D 80/50; B32B 5/02; B32B 27/08; B32B 27/12; B32B 27/302;
(Continued)

(56) References Cited

U.S. PATENT DOCUMENTS 3,144,349 A * 8/1964 Douglas Teague Ernest ..............
B32B 15/08
416/1
4,842,663 A * 6/1989 Kramer ................... B23P 6/005
156/153

(Continued)

FOREIGN PATENT DOCUMENTS

DE    102009002501 A1    10/2010
EP       2047979 A1     4/2009
(Continued)

OTHER PUBLICATIONS

TWI global, "Welding techniques for thermoplastics", Mar. 26, 2014, TWI (Year: 2014) (Year: 2014).*
(Continued)

*Primary Examiner* — J. Todd Newton
(74) *Attorney, Agent, or Firm* — Nath, Goldberg & Meyer; Jerald L. Meyer; Tanya E. Harkins (57) ABSTRACT

The invention relates to a wind turbine blade having a leading edge erosion shield. The erosion shield comprises an inner layer of a first thermoplastic material, the inner layer being an integral part of the shell body of the wind turbine blade. The erosion shield further comprises an outer layer of a second thermoplastic material attached to the inner layer.

2 Claims, 5 Drawing Sheets

(51) Int. Cl.

| | | |
|---|---|---|
| *B32B 5/02* | (2006.01) | |
| *B32B 27/08* | (2006.01) | |
| *B32B 27/12* | (2006.01) | |
| *B32B 27/30* | (2006.01) | |
| *B32B 27/36* | (2006.01) | |
| *B32B 37/02* | (2006.01) | |
| *B32B 37/06* | (2006.01) | |
| *B32B 37/10* | (2006.01) | |
| *B32B 37/24* | (2006.01) | |
| *B29C 73/10* | (2006.01) | |
| *B29D 99/00* | (2010.01) | |
| *B29K 55/02* | (2006.01) | |
| *B29K 67/00* | (2006.01) | |

(52) U.S. Cl.
CPC .......... *B32B 27/302* (2013.01); *B32B 27/308* (2013.01); *B32B 27/365* (2013.01); *B32B 37/02* (2013.01); *B32B 37/06* (2013.01); *B32B 37/1018* (2013.01); *B32B 37/24* (2013.01); *F03D 80/50* (2016.05); *B29C 73/10* (2013.01); *B29D 99/0025* (2013.01); *B29K 2055/02* (2013.01); *B29K 2067/00* (2013.01); *B32B 2250/03* (2013.01); *B32B 2250/24* (2013.01); *B32B 2255/10* (2013.01); *B32B 2260/021* (2013.01); *B32B 2260/046* (2013.01); *B32B 2270/00* (2013.01); *B32B 2305/076* (2013.01); *B32B 2305/72* (2013.01); *B32B 2307/554* (2013.01); *B32B 2355/02* (2013.01); *B32B 2367/00* (2013.01); *B32B 2369/00* (2013.01); *B32B 2603/00* (2013.01); *F05B 2230/90* (2013.01); *F05B 2240/2022* (2013.01); *F05B 2240/30* (2013.01); *F05B 2280/6003* (2013.01); *Y02E 10/72* (2013.01); *Y02P 70/50* (2015.11)

(58) Field of Classification Search
CPC ..... B32B 27/308; B32B 27/365; B32B 37/02; B32B 37/06; B32B 37/1018; B32B 37/24; B32B 2250/03; B32B 2250/24; B32B 2255/10; B32B 2260/021; B32B 2260/046; B32B 2270/00; B29C 73/10; B29D 99/0025; B29K 2055/02; B29K 2067/00
See application file for complete search history.

(56) References Cited

U.S. PATENT DOCUMENTS

| | | | | |
|---|---|---|---|---|
| 5,088,665 | A * | 2/1992 | Vijgen | B64C 23/06 244/198 |
| 5,174,024 | A * | 12/1992 | Sterrett | B64C 27/46 29/889.71 |
| 5,306,120 | A * | 4/1994 | Hammer | C23C 4/02 416/224 |
| 8,162,590 | B2 * | 4/2012 | Haag | F03D 1/0633 415/4.3 |
| 8,673,106 | B1 * | 3/2014 | Jolley | B29C 43/18 156/285 |
| 8,961,142 | B2 * | 2/2015 | Wansink | F03D 1/0675 416/224 |
| 9,890,764 | B2 * | 2/2018 | Pal | F03D 1/0675 |
| 10,113,531 | B2 * | 10/2018 | Caruso | F03D 1/0675 |
| 10,161,381 | B2 * | 12/2018 | Tobin | F03D 1/0675 |
| 10,197,041 | B2 * | 2/2019 | Caruso | F03D 1/0675 |
| 10,240,577 | B2 * | 3/2019 | Yarbrough | F03D 1/0675 |
| 10,253,752 | B2 * | 4/2019 | Caruso | F03D 1/0675 |
| 10,316,818 | B2 * | 6/2019 | Caruso | F03D 1/0675 |
| 2003/0099546 | A1 * | 5/2003 | Stiesdal | F03D 1/0641 416/228 |
| 2004/0118978 | A1 * | 6/2004 | Anning | B64C 27/473 244/123.1 |
| 2007/0036659 | A1 * | 2/2007 | Hibbard | B29C 63/22 416/233 |
| 2007/0140858 | A1 * | 6/2007 | Bakhuis | F03D 1/0675 416/223 R |
| 2007/0231156 | A1 * | 10/2007 | Hong | F01D 5/005 416/241 R |
| 2008/0075603 | A1 * | 3/2008 | Van Breugel | B29C 65/542 416/232 |
| 2008/0107540 | A1 * | 5/2008 | Bonnet | F03D 1/0675 416/229 R |
| 2008/0181775 | A1 * | 7/2008 | Livingston | F03D 1/0675 416/95 |
| 2008/0304971 | A1 * | 12/2008 | Liebmann | B29C 70/086 416/20 R |
| 2009/0057297 | A1 * | 3/2009 | Boschet | B29C 65/46 219/603 |
| 2009/0074585 | A1 * | 3/2009 | Koegler | F03D 1/0675 416/228 |
| 2009/0092842 | A1 * | 4/2009 | Hoover | B32B 3/04 428/435 |
| 2009/0148300 | A1 * | 6/2009 | Driver | B29C 65/3412 416/223 R |
| 2009/0246033 | A1 * | 10/2009 | Rudling | B32B 27/30 416/241 A |
| 2010/0008788 | A1 * | 1/2010 | Barbee | F01D 5/288 416/224 |
| 2010/0135820 | A1 * | 6/2010 | Olson | F03D 1/0675 416/241 R |
| 2011/0042524 | A1 * | 2/2011 | Hemmelgarn | B64C 3/48 244/203 |
| 2011/0142668 | A1 * | 6/2011 | Rao | F03D 1/0675 416/229 R |
| 2011/0142678 | A1 * | 6/2011 | Santiago | F03D 80/30 416/241 R |
| 2012/0034094 | A1 * | 2/2012 | Wansink | B29D 99/0025 416/230 |
| 2012/0057984 | A1 * | 3/2012 | Fuglsang | F03D 1/0641 416/234 |
| 2012/0094099 | A1 * | 4/2012 | Hong | F01D 5/005 428/213 |
| 2012/0156049 | A1 * | 6/2012 | Hong | B23P 6/007 416/224 |
| 2012/0257979 | A1 * | 10/2012 | Jensen | F03D 1/0608 416/223 R |
| 2013/0101432 | A1 * | 4/2013 | Harris, Jr. | B64C 11/205 416/241 R |
| 2014/0010961 | A1 * | 1/2014 | Sorondo Zabala | F03D 1/0675 427/290 |
| 2014/0011414 | A1 * | 1/2014 | Kruckenberg | B32B 5/24 442/181 |
| 2014/0093382 | A1 * | 4/2014 | Fuglsang | F03D 1/0641 416/236 R |
| 2015/0132140 | A1 * | 5/2015 | Haag | F03D 1/0675 416/224 |
| 2016/0046088 | A1 * | 2/2016 | Haag | B05D 7/50 427/535 |
| 2016/0215757 | A1 * | 7/2016 | Behmer | B29C 70/086 |
| 2016/0376709 | A1 * | 12/2016 | Galos | C25D 5/56 428/457 |
| 2017/0058863 | A1 * | 3/2017 | Yarbrough | F03D 80/50 |
| 2017/0074237 | A1 * | 3/2017 | Caruso | F03D 1/0633 |
| 2018/0209400 | A1 * | 7/2018 | Drachmann Haag | F03D 1/0675 |
| 2018/0230966 | A1 * | 8/2018 | Drachmann Haag | B29C 65/10 |

FOREIGN PATENT DOCUMENTS

| | | | | |
|---|---|---|---|---|
| EP | 2153065 | A2 * | 2/2010 | ............ F03D 1/065 |
| EP | 3495124 | A1 * | 6/2019 | ............ B29C 73/02 |
| WO | 2010/117262 | A1 | 10/2010 | |
| WO | 2013/019524 | A1 | 2/2013 | |
| WO | 2013/092211 | A1 | 6/2013 | |
| WO | WO-2013092211 | A1 * | 6/2013 | ............ F03D 1/0633 |
| WO | WO-2015015202 | A1 * | 2/2015 | ............ F03D 1/0675 |

(56) References Cited

FOREIGN PATENT DOCUMENTS

OTHER PUBLICATIONS

Office Action dated Mar. 10, 2021 issued in corresponding Indian Application No. 201847002596.

\* cited by examiner

WIND TURBINE BLADE HAVING AN EROSION SHIELD

This is a National Phase Application filed under 35 U.S.C. 371 as a national stage of PCT/EP2015/066397, filed Jul. 17, 2015, the content of which is hereby incorporated by reference in its entirety.

FIELD OF THE INVENTION

The present invention relates to a wind turbine blade having an erosion shield, a wind turbine with such blade and methods of manufacturing and repairing such blade.

BACKGROUND OF THE INVENTION

During the lifetime of a wind turbine, considerable resources are expended on continued maintenance operations to ensure optimum turbine performance. With regard to the blades of a wind turbine, erosion at the leading edge of the blades is one area of attention.

It is known to provide an erosion shield at the leading edge of a wind turbine blade. The erosion shield comprises a layer or coating of resilient erosion resistant material which is applied along the length of the blade covering the leading edge. The erosion shield provides improved resistance to erosion, being usually formed of a resilient material as opposed to the relatively brittle fibre composite material used to produce the shell body of a wind turbine blade, and accordingly acts to improve the overall durability of the wind turbine blade. An example of an erosion shield comprising a polymeric film can be seen in EP 2 153 065.

Field experience has shown that such erosion shields or erosion tapes will last approximately between 5-8 years, depending on the environmental conditions of the location of the wind turbine, as well as the turbine operating conditions, especially blade tip speed.

In the case of rupture of the erosion shield, maintenance is required to avoid reduced turbine performance involving extensive and complicated procedures to stop operation of the turbine, remove the ruptured shield from along the leading edge of the turbine blade, and to apply a new erosion shield along the leading edge.

An alternative way of protecting the leading edge of a wind turbine blade is suggested in US 2012/0034094.

A low surface energy thermoplastic cover is mounted on the leading edge using a curable resin as the adhesive, the cover being a composite comprising a layer of UV-resistant thermoplastic material and cured epoxy resin.

A similar approach is taken in WO 2015/015202 by using an erosion resistant preform comprising a thermoplastic film outer layer fused to a fibre substrate. The preform is placed in a mould and connected to a fairing body through further fibre layers and curable resin.

It is an object of the invention to provide a wind turbine blade having an improved erosion shield which is durable and comparatively easy to service.

SUMMARY OF THE INVENTION

The invention pertains to a wind turbine blade having a blade shell body made of a composite material,
said composite material comprising reinforcement fibres and a thermosetting resin,
said wind turbine blade comprising a tip end and a root end, as well as a leading edge and a trailing edge,
said wind turbine blade comprising a pressure side and a suction side, characterized in that
said wind turbine blade further comprising an erosion shield,
said erosion shield extending along at least a part of said leading edge, and being integrated in the blade shell body along an outer surface of the wind turbine blade,
said erosion shield comprising an inner layer comprising a first thermoplastic material, and an outer layer comprising a second thermoplastic material and being attached to the first thermoplastic material of the inner layer, said first thermoplastic material of the inner layer being an integral part of the shell body.

According to the present invention, a wind turbine blade with improved erosion resistance along at least part of the leading edge of the blade is provided.

The use of a layered erosion shield comprising two thermoplastic materials allows for the combination of a first thermoplastic material optimized for the integration in the shell body of the blade, and a second thermoplastic material optimized for secure attachment to the first thermoplastic material and for withstanding erosion.

The first thermoplastic material may be chosen for good compatibility with the thermosetting resin and the fibre enforcement of the blade shell body. The first thermoplastic material typically is integrated in the shell body during moulding of the shell body or a part thereof.

The second thermoplastic material may be chosen to provide a hard surface, an elastic surface and/or a tough, resilient surface, depending on the desired erosion protection and the particular conditions the wind turbine blade is expected to experience when being used in a certain environment. A wind turbine blade being mounted on a wind turbine placed in an off-shore environment may demand different thermoplastic materials, in particular, a different second thermoplastic material, when compared to a wind turbine blade being mounted on a wind turbine placed on-shore in, for example, a dessert.

In an embodiment of the invention, the second thermoplastic material is attached to the first thermoplastic material by a plastic welding process selected from laser welding, thermal welding, such as hot gas welding, speed tip welding, spot welding, contact welding and hot plate welding, ultrasonic welding, high frequency welding and solvent welding.

Using a plastic welding process for joining the second thermoplastic material to the first thermoplastic material and thereby, to the leading edge of a wind turbine blade, has multiple advantages:

The welding process may be automated or semi-automated, which may reduce production costs and improve reproducibility and quality.

The bond established between the first and second thermoplastic materials corresponds to an entanglement of the polymeric chains of the two materials at the interface, making the bond extremely durable and very unlikely to fail during operation of the blade.

The process and the quality of the established material connection are more or less independent of the environment on the site of welding. At the blade manufacturing site, careful control of temperature and relative humidity, usually important when using, for example, adhesives, paints, coatings, tapes and the like, may not be necessary. Furthermore, a damaged or worn erosion shield may be repaired on site while the blade is on the wind turbine or at least without moving the blade into a controlled environment. Since erosion along the leading edge is a main reason for blade failure and repair, the erosion shield according to the invention may lengthen the intervals between necessary repairs considerably and at the same time make any repairs easier and safer. This reduces the cost of energy from a wind turbine.

In principle, any welding process suitable for welding plastic materials may be used according to embodiments of the invention.

In preferred embodiments heat welding is utilized.

Hot air welding is one possible method applicable according to embodiments of the invention. Hot air welding may be both versatile and economic.

Laser welding may also be used, because it produces very reproducible results with a variety of thermoplastic materials, including those useful in the erosion shield according to these preferred embodiments. Laser welding may be automated and can also be adapted for use on site in the field.

Thereby, very reproducible joints may be obtained.

Laser welding typically requires the first thermoplastic material to absorb energy at the laser wavelength, while the second plastic material should let the laser wavelength pass through at least partly to reach the interface between the two materials. If the parts to be joined are in close contact, the laser transparent material is also heated at the interface by conduction and a very durable joint is formed.

Close contact between the thermoplastic materials may be established, for example, by using a clamping device to hold the two materials close together during the laser welding process.

In some embodiments, the first thermoplastic material comprises heat absorbing means, for example carbon black, other special pigmentation or other additives.

Furthermore, laser welding does not require any consumables and as such does not add any extra weight to the wind turbine blade.

Using the welded sandwich construction between two thermoplastic materials to make up the erosion shield makes possible the selection of a first thermoplastic material adapted for optimization of integration within the composite material of the blade shell body and for optimization of the welding process and of a second thermoplastic material having good weather—and wear resistance. In this way an extremely durable erosion shield may be obtained.

In some embodiments of the invention, the second thermoplastic material comprises one or more UV-absorbers.

In an embodiment of the invention the first thermoplastic material is provided in the form of one or more sheets, foils or strips.

The first thermoplastic material may be flexible enough to be able to adapt to the required shape for forming the leading edge or part of the leading edge of the wind turbine blade in the moulding of the shell body or part of the shell body. This may be obtained by using sheets or foils that can follow the shape of the mould surface in the moulding process which may involve vacuum assisted resin transfer.

It may be advantageous to heat the foil, sheet or strip to a temperature at which the first thermoplastic material softens slightly to assist positioning of the foil or sheet in the mould.

In an embodiment of the invention the first thermoplastic material has a thickness of between 0.2 and 2 mm, preferably between 0.4 and 1.2 mm.

The thickness of the sheet, foil or strip of the first thermoplastic material may vary. A certain thickness is required to achieve a suitable and well-functioning base material unto which the second thermoplastic material can be attached, for example by laser welding. If the thickness becomes too great, flexibility may be impaired and material costs go up.

In an embodiment of the invention the first thermoplastic material is provided in the form of one or more preformed parts.

In advantageous embodiments of the invention the first thermoplastic material is a preformed part that may be placed directly in the mould, the part following the surface contour of the mould. According to these embodiments, the first thermoplastic material may be preformed for example in an injection moulding process, in a vacuum forming process or in an extrusion process.

According to an embodiment of the invention the one or more preformed parts have a thickness of between 0.2 and 2 mm, preferably between 0.4 and 1.2 mm.

The thickness of the preformed part or parts of the first thermoplastic material may vary for different erosion shields and also a single preformed part may vary in thickness throughout the part itself. For example, the part may have tapered edges.

According to embodiments of the invention the second thermoplastic material is one or more sheets or foils having a thickness of between 0.2 and 1 mm, preferably between 0.4 and 0.8 mm.

The thickness of the second thermoplastic material is a trade-off between ease of attachment to the first thermoplastic material and the desire to obtain long-lasting erosion resistance. The wearable layer should not be too thin, because erosion may remove the second thermoplastic material too quickly, making service intervals too short.

On the other hand, a comparatively thick material may be difficult to handle and attach in practice.

If, for example, laser welding is used to attach the second thermoplastic material to the first thermoplastic material, the particular laser used has to deliver energy to the absorbing first material through the second material which is best achieved, if the second thermoplastic material is not too thick.

In an embodiment of the invention the second thermoplastic material is one or more preformed parts.

In advantageous embodiments of the invention the second thermoplastic material is a preformed part that may be designed to follow the surface contour of the first thermoplastic material, thereby facilitating the attachment process. According to these embodiments, the second thermoplastic material may be preformed for example in an injection moulding process, in a vacuum forming process or in an extrusion process.

In an embodiment of the invention the one or more preformed parts have a thickness of between 0.2 and 1.0 mm, preferably between 0.4 and 0.8 mm.

The thickness of the second thermoplastic material is a trade-off between ease of attachment to the first thermoplastic material and the desire to obtain long-lasting erosion resistance. The wearable layer should not be too thin, because erosion may remove the second thermoplastic material too quickly, making service intervals too short.

On the other hand, a comparatively thick material may be difficult to handle and attach in practice.

If, for example, laser welding is used to attach the second thermoplastic material to the first thermoplastic material, the particular laser used has to deliver energy to the absorbing first material through the second material which is best achieved, if the second thermoplastic material is not too thick.

According to an embodiment of the invention the first thermoplastic material is selected from the group consisting of polystyrene, poly(acrylonitrile butadiene styrene), poly(acrylonitrile styrene acrylate), poly(styrene acrylonitrile), polycarbonate, polyether ether ketone, polybutylene terephthalate or any combination thereof.

A number of the thermoplastic materials may be used for the first thermoplastic material. In a preferred embodiment of the invention, poly(acrylonitrile butadiene styrene) forms the first thermoplastic material. In this case, very good integration of the first thermoplastic material with the thermoset resin and the fibre reinforcement in the shell body may be achieved, especially when using polyester resin.

According to further embodiments of the invention the second thermoplastic material is selected from the group consisting of polystyrene, poly(acrylonitrile butadiene styrene), poly(acrylonitrile styrene acrylate), poly(styrene acrylonitrile), polycarbonate, polyether ether ketone, polybutylene terephthalate, ultra-high molecular weight polyethylene, thermoplastic elastomer, such as thermoplastic polyurethane or any combination thereof. The second thermoplastic material is selected to have good erosion resistance. This may be obtained by using very hard thermoplastic materials such as polyether ether ketone, or softer, more tough and resilient materials such as polycarbonate or thermoplastic polyurethane.

In an embodiment of the invention the first thermoplastic material is selected from the group consisting of poly(acrylonitrile butadiene styrene), polycarbonate, blends of poly(acrylonitrile butadiene styrene) and polycarbonate, and combinations thereof and the second thermoplastic material is selected from the group consisting of polycarbonate, blends of poly(acrylonitrile butadiene styrene) and polycarbonate, thermoplastic polyurethane and combinations thereof.

According to these preferred embodiments, several combinations of a first thermoplastic material and a second thermoplastic material are possible.

For example, poly(acrylonitrile butadiene styrene) as a first thermoplastic material may be combined with a blend of poly(acrylonitrile butadiene styrene) and polycarbonate as the second thermoplastic material.

When poly(acrylonitrile butadiene styrene) as the first thermoplastic material is combined with polycarbonate as the second thermoplastic material, a preferred embodiment of the present invention has been obtained.

When a blend of poly(acrylonitrile butadiene styrene) and polycarbonate as the first thermoplastic material is combined with thermoplastic polyurethane as the second thermoplastic material, a further preferred embodiment of the present invention has been obtained.

When poly(acrylonitrile butadiene styrene) as the first thermoplastic material is combined with a blend of poly(acrylonitrile butadiene styrene) and polycarbonate as the second thermoplastic material, a preferred embodiment of the present invention has been obtained.

In principle, the first—and the second thermoplastic materials can both be of the same type, for example, polycarbonate.

When using, for example, laser welding for attachment of the second thermoplastic material to the first thermoplastic material, and polycarbonate is used for both materials, the first polycarbonate must be able to absorb laser radiation while the second polycarbonate needs to be at least partly transparent with regard to laser radiation at a given laser wavelength.

The same is true for other combinations.

According to an embodiment of the invention the erosion shield further comprises a coating applied on top of said second thermoplastic material.

Application of a coating may serve the purpose of further enhancing erosion resistance, if an erosion resistant coating is applied. Furthermore, the coating may provide the wind turbine blade with an appealing finish. In this regard it should be noted that the second thermoplastic material may be chosen to match the blade in colour, to match the colour of a coating or to provide a different colour to parts of the leading edge for aesthetic reasons or for reasons of better visibility of the blades.

In an embodiment of the invention the wind turbine blade has a recess positioned along at least a part of the leading edge comprising the first thermoplastic material and the second thermoplastic material, whereby the surface of the second thermoplastic material after being attached to the first thermoplastic material is substantially flush with the adjacent surface of the blade shell body.

It may be aerodynamically favourable to have a completely smooth wind turbine blade surface. This may, for example, be obtained by placing the erosion shield in a recess adapted for accommodating it.

Such recess may be established, for example, by first placing a low surface energy material such as silicone rubber in the mould for moulding the blade shell body, before placing the first thermoplastic material in the mould on top of the low surface energy material. After moulding the low surface energy material is removed and leaves a recess for attaching the second thermoplastic material to the first thermoplastic material.

The thickness of the low surface energy material may be chosen to substantially match the thickness of the second thermoplastic material.

In embodiments of the invention the erosion shield extends 75-200 mm from the leading edge onto the pressure side of the wind turbine blade and 75-200 mm onto the suction side of the wind turbine blade.

The part of the wind turbine blade most prone to erosion may be a zone on and adjacent to the leading edge. In this context the leading edge is to be understood as such a zone extending somewhat onto the pressure- and suction side of the blade as opposed to a very narrow edge.

According to further embodiments the erosion shield is arranged along an outboard longitudinal part of the blade and extending along at least 10% of the blade length, at least 20% of the blade length or at least 30% of the blade length.

Leading edge erosion is, in principle, most pronounced the higher the relative speed of the surface against the eroding medium. Accordingly, it may not be necessary to provide an erosion shield along the leading edge of the full airfoil region but only on the outboard parts of the leading edge farthest away from the root section.

Alternatively, according to further embodiments, the wind turbine blade may have an erosion shield arranged substantially along the leading edge of the full airfoil region.

In an embodiment of the invention the erosion shield is arranged along an outboard longitudinal part of the blade and further extends around the tip end of the wind turbine blade towards the trailing edge of the wind turbine blade.

The tip of the wind turbine blade has the highest relative speed during rotation of the blade when mounted on a wind turbine. Tip speeds may reach speed of 60 m/s or more. Accordingly, an attractive possibility is to let the erosion shield also shield the tip of the blade by letting the erosion shield extend around the tip.

In an embodiment of the invention the first thermoplastic material comprises chemical groups capable of reacting with components of the thermosetting resin.

It is advantageous that the first thermoplastic material is an integral part of the blade shell body. This may be achieved, if the thermosetting resin can chemically react with the first thermoplastic material. If, for example, the first thermoplastic material is poly(acrylonitrile butadiene styrene) and the thermosetting resin is unsaturated polyester, a reactive styrene solvent comprised in the resin may establish bonds to the poly(acrylonitrile butadiene styrene) via the styrene co-monomer of poly(acrylonitrile butadiene styrene).

A further advantage when using unsaturated polyester thermosetting resin is that the cure of the resin may be achieved at ambient temperature, whereby any deformation or undesired softening of the first thermoplastic material during moulding is avoided.

The present invention further pertains to a wind turbine comprising a wind turbine blade comprising an erosion shield as described herein.

The present invention also pertains to a method of manufacturing a wind turbine blade said blade for a wind turbine having a blade shell body made of a composite material, said composite material comprising reinforcement fibres and a thermosetting resin, said wind turbine blade comprising a tip end and a root end, as well as a leading edge and a trailing edge, said method comprising the steps of:

Placing a first thermoplastic material in a mould for moulding at least a part of the blade shell body, said first thermoplastic material being placed in the mould to form at least part of the leading edge of the outer surface of the wind turbine blade, placing reinforcement fibres in the mould, contacting the first thermoplastic material and the reinforcement fibres with thermosetting resin, and curing said resin to form at least a part of the shell body, optionally joining blade shell body parts to form a complete blade shell body and attaching to said first thermoplastic material a second thermoplastic material.

In a further aspect the invention relates to method of repairing the erosion shield of a wind turbine blade as described herein, the method comprising the steps of, after erosion has happened during use of the wind turbine blade, removing remnants of the second thermoplastic material from the erosion shield, attaching to the first thermoplastic material a second thermoplastic material in a plastic welding process, optionally while the wind turbine blade is mounted on a wind turbine.

Maintenance of wind turbines is typically costly and involves undesirable down time where no energy is produced.

Wind turbine blades may also require maintenance, one major reason for this being leading edge erosion. The repair method according to the invention is surprisingly well suited for on-site repair because the attachment of a new layer of second thermoplastic material in a plastic welding process is more or less independent on the local conditions at the location of repair.

Typically, use of adhesives to attach erosion shields, for example, films or tapes, would benefit from controlled humidity and temperature to secure good bonding and also require great skills and cleanliness. The same is true for application of erosion resistant coatings. Such control is often not possible at all or only to a sub-optimal extent if the repair is made on-site. Using plastic welding such as laser welding, does not require a special climate, but may be applied while the blade is mounted on the turbine. This allows repairs all year as opposed to other methods being applicable only during summer. If not all of the second thermoplastic material has been eroded away, it may be necessary to remove any remnants to provide a substantially clean surface of the first thermoplastic material onto which a flexible sheet or a preformed part of the second thermoplastic material can be welded. In this way, reliable and consistent repairs can be made, the service time of the erosion shield being predictable, making scheduled maintenance a viable option.

DETAILED DESCRIPTION

The invention is explained in detail below with reference to an embodiment shown in the drawings, in which.

Figure 1:
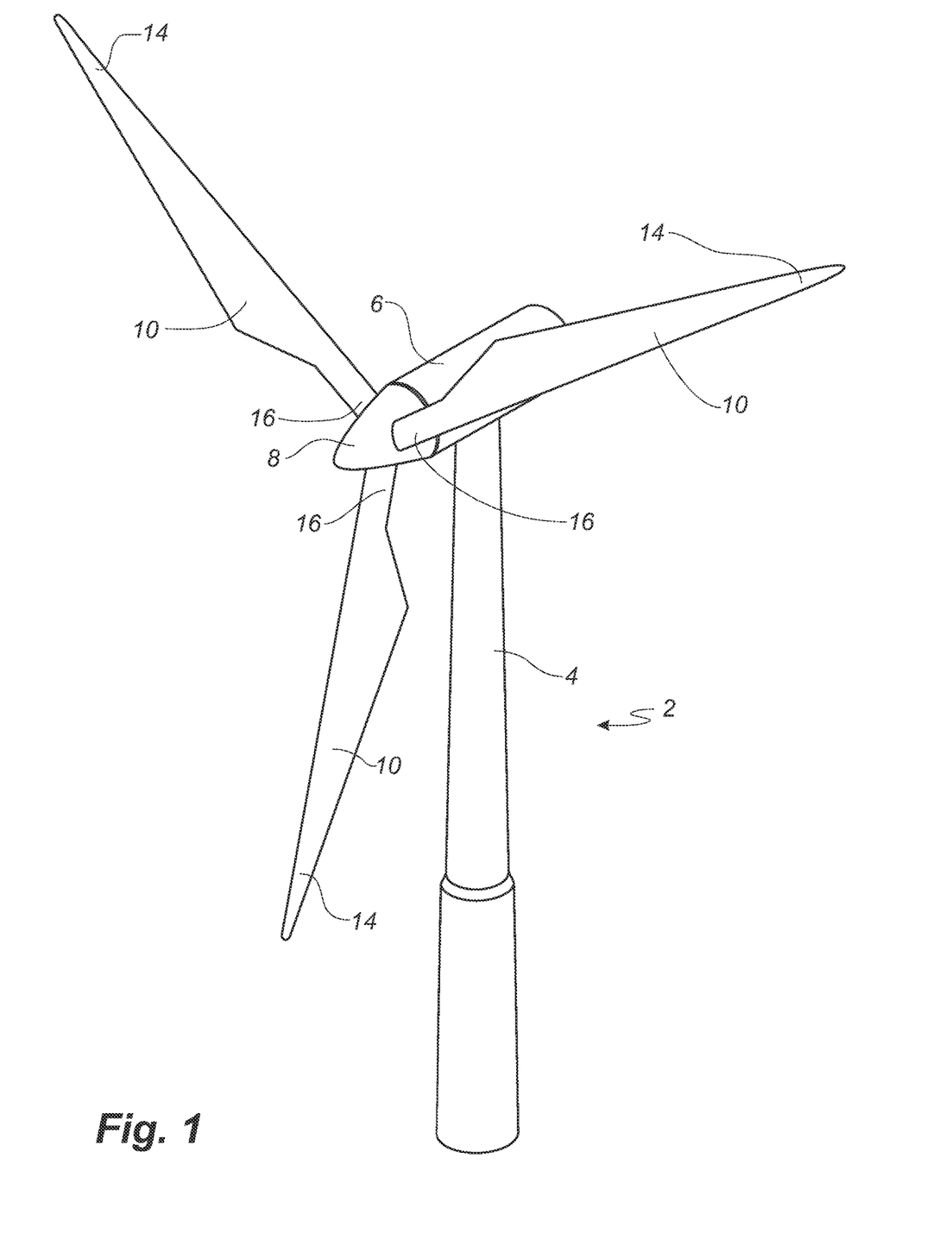
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

Figure 2:
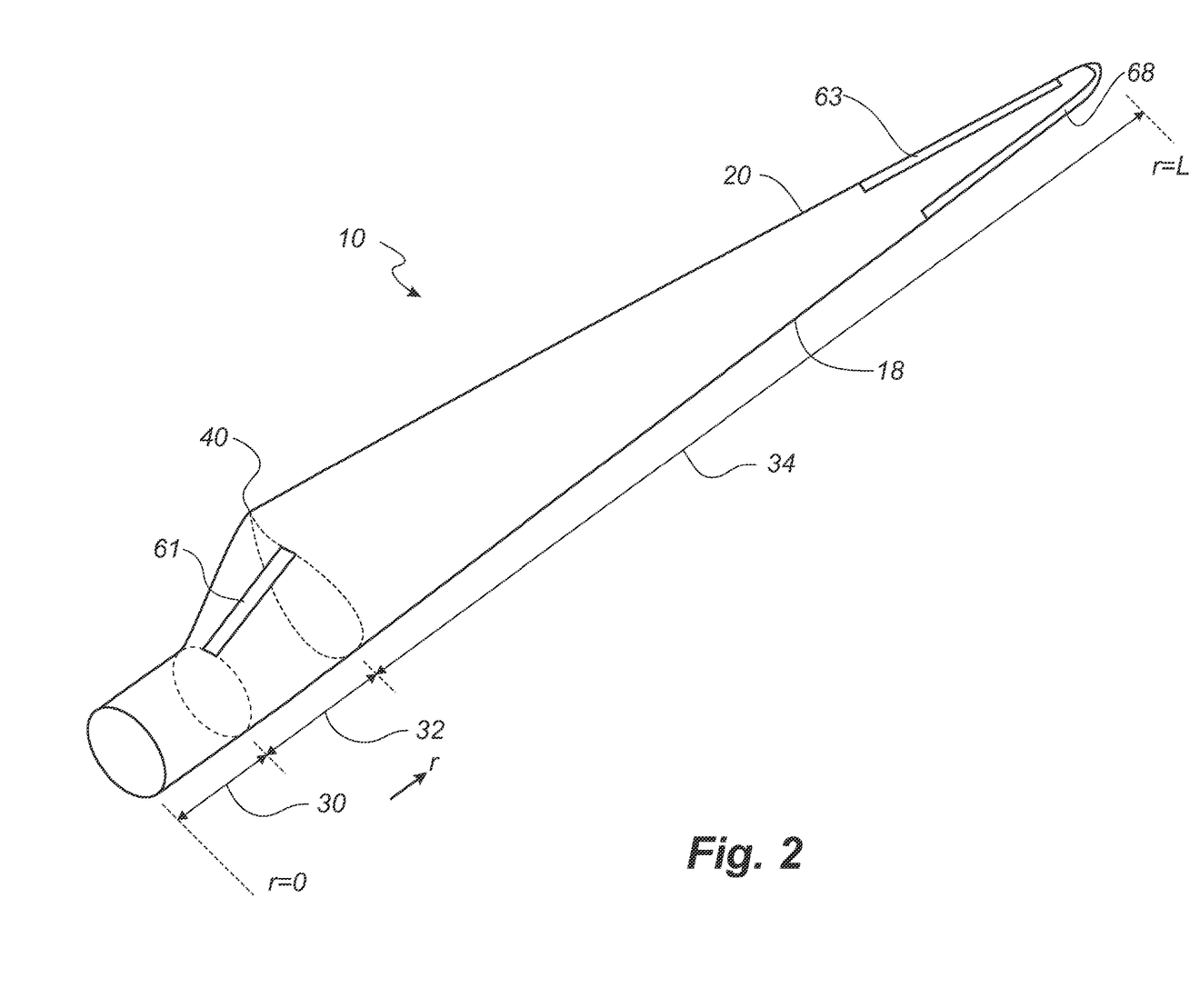
FIG. 2 shows a schematic view of a wind turbine blade according to the invention.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

An integrated thermoplastic anchoring site 61 for attaching, for example, a spoiler in the transition region 32 is shown. A further integrated site 63 for attaching, for example, noise reducing serrations is indicated at the trailing edge 20 in the airfoil region 34. At the leading edge 18, an attachment site 68 for a second thermoplastic material is shown, thereby completing an erosion shield. It is seen that the erosion shield may extend around the tip of the blade.

It is clear that the blade can have more or fewer attachment sites than the three shown on FIG. 2.

The attachments sites are integrated in the wind turbine blade during manufacturing of the blade. This integration may be achieved by placing a thermoplastic material in the mould for the blade body shell or parts of the blade body shell so that the thermoplastic material is facing the outer surface of the final blade, as indicated on FIG. 2. Different attachment sites may comprise the same or different thermoplastic materials. For example, attachment site 68 may be poly (acrylonitrile butadiene styrene) while attachment sites 61 and 63 are polycarbonate or all attachment sites are poly (acrylonitrile butadiene styrene).

Figure 3:
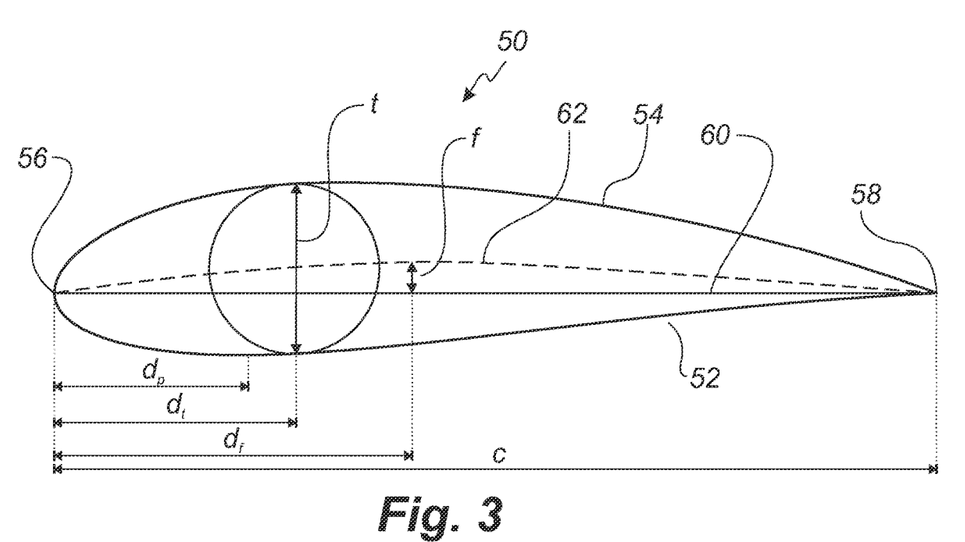
FIG. 3 shows a schematic view of an airfoil profile.
Figure 4:
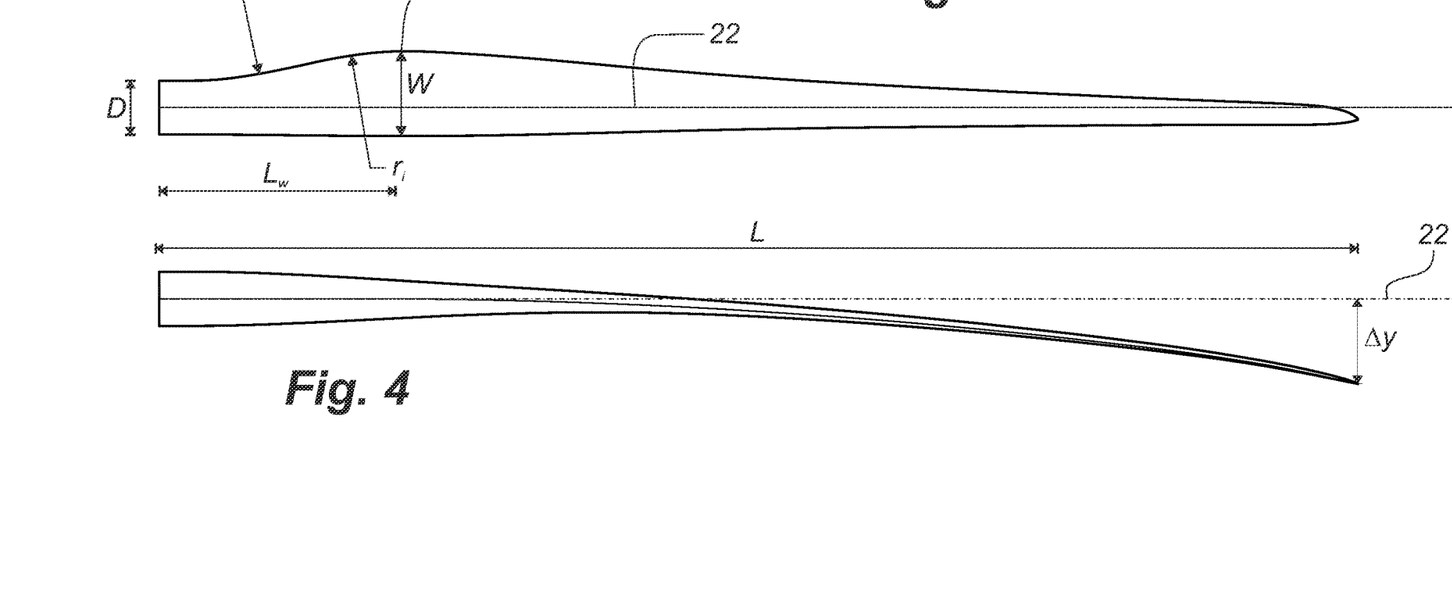
FIG. 4 shows a schematic view of the wind turbine blade according to the invention, seen from above and from the side.

FIGS. 3 and 4 depict parameters, which are used to explain the geometry of the wind turbine blade according to the invention.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position df of the maximum camber f, the maximum airfoil thickness t, which is the largest diameter of the inscribed circles along the median camber line 62, the position dt of the maximum thickness t, and a nose radius (not shown). These parameters are typically defined as ratios to the chord length c. Thus, a local relative blade thickness t/c is given as the ratio between the local maximum thickness t and the local chord length c. Further, the position dp of the maximum pressure side camber may be used as a design parameter, and of course also the position of the maximum suction side camber.

FIG. 4 shows other geometric parameters of the blade. The blade has a total blade length L. As shown in FIG. 3, the root end is located at position r=0, and the tip end located at r=L. The shoulder 40 of the blade is located at a position r=Lw, and has a shoulder width W, which equals the chord length at the shoulder 40. The diameter of the root is defined as D. The curvature of the trailing edge of the blade in the transition region may be defined by two parameters, viz. a minimum outer curvature radius ro and a minimum inner curvature radius ri, which are defined as the minimum curvature radius of the trailing edge, seen from the outside (or behind the trailing edge), and the minimum curvature radius, seen from the inside (or in front of the trailing edge), respectively. Further, the blade is provided with a prebend, which is defined as $\Delta y$, which corresponds to the out of plane deflection from a pitch axis 22 of the blade.

Figure 5:
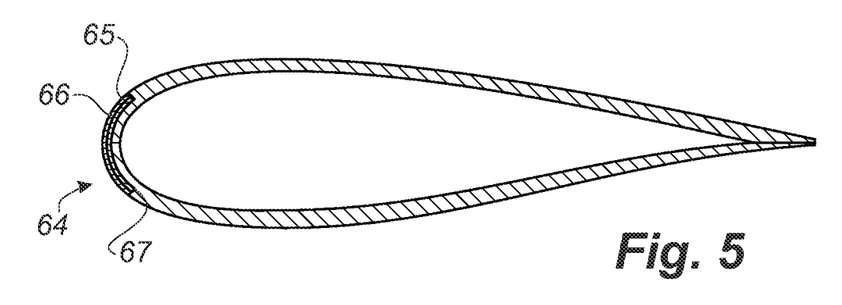
FIG. 5 shows a schematic view of an airfoil profile having an erosion shield comprised of two layers of thermoplastic materials at the leading edge.

FIG. 5 shows a schematic view of an airfoil profile having an erosion shield 64 comprised of two layers, one layer of a first thermoplastic material 65 and a second layer of a second thermoplastic material 66 at the leading edge. The erosion shield is situated in a recess 67 in the blade and it is indicated that the outer surface of the erosion shield is flush with the surface of the shell body.

The leading edge is not strictly defined as a narrow edge but is indicated to extend to both suction side and pressure side of the airfoil. The leading edge is broadly understood as the part of the blade cutting through the air during rotation of the rotor of the wind turbine, this part of the blade thereby being most vulnerable towards erosion.

Figure 6:
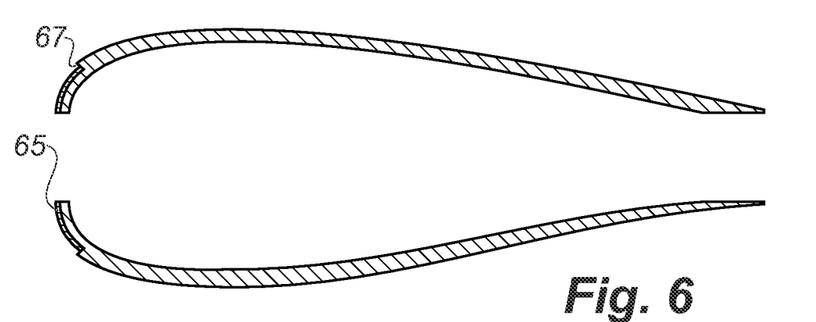
FIG. 6 shows a schematic view of an airfoil profile of two shell body parts having an integrated first thermoplastic material in a recess at the leading edge.

FIG. 6 shows a schematic view of an airfoil profile of two shell body parts having an integrated first thermoplastic material 65 in a recess 67 at the leading edge. The first thermoplastic material acts as a site for attachment of a second thermoplastic material, the second thermoplastic material completing an erosion shield at the leading edge of the blade. The completed erosion shield corresponds to the shield 64 shown in FIG. 5.

Figure 7:
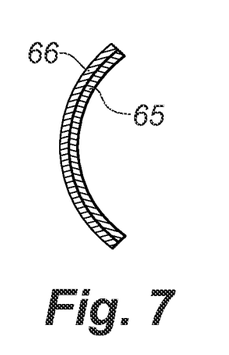
FIG. 7 shows a schematic view of an erosion shield comprised of 2 layers of thermoplastic materials joined together.

FIG. 7 shows a schematic view of an erosion shield comprised of 2 layers, one layer of a first thermoplastic material 65 and a second layer of a second thermoplastic material 66. joined together. Such a pre-fabricated erosion shield may be integrated in the shell body to provide a complete leading edge protection. The two layers in the erosion shield are preferably joined by plastic welding. In particular laser welding is a preferred method of joining the 2 layers of thermoplastic material. The first thermoplastic material 65 and the second thermoplastic material 66 are brought into close contact and a laser is used to melt the second thermoplastic material and the first thermoplastic material at the interface between the two materials whereby a bond is established between the two materials.

It may be beneficial to pre-fabricate such two-layer erosion shield before integration with the shell body, because the joining of the two thermoplastic materials in some embodiments may be more conveniently done before integration with the shell body, for example, by placing the pre-fabricated erosion shield or part of a pre-fabricated erosion shield in a mould to form the shell body or a part thereof.

Figure 8:
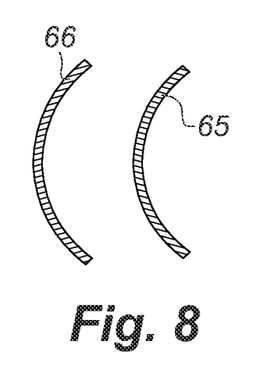
FIG. 8 shows a schematic view of pre-formed parts of a first—and a second thermoplastic material, respectively.

FIG. 8 shows a schematic view of pre-formed parts of a first 65—and a second 66 thermoplastic material, respectively. Typically, the pre-formed part of the first thermoplastic material 65 is placed in the mould when moulding the shell body or part of the shell body of the wind turbine blade. The pre-formed part of the second thermoplastic material is then attached to the pre-formed part of the first thermoplastic material post-moulding to complete an erosion shield at the leading edge of the blade. When using pre-formed parts, both the correct placement of the pre-formed part of the first thermoplastic material in the mould and correct attachment of the second part post moulding may be easier compared to using flexible thermoplastic foils or sheets, because the pre-formed parts, due to narrow tolerances achievable during their manufacturing, are relatively easy to handle and fit together nicely when attached to one another.

The pre-formed part of the first thermoplastic material shown here is applicable in a one-shot moulding process. It should be understood that, if, for example, the blade is formed from two shell body parts (see FIG. 6), the pre-formed part of the first thermoplastic material may also constitute two pre-formed parts, one to be placed in a first mould for moulding a first shell body part and another to be placed in a second mould for a second shell body part.

Figure 9:
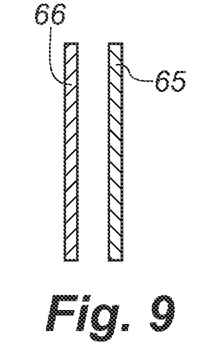
FIG. 9 shows a schematic view of two sheets/foils of a first—and a second thermoplastic material, respectively.

FIG. 9 shows a schematic view of two sheets/foils of a first 65—and a second 66 thermoplastic material, respectively. Flexible sheets or foils may be advantageous to use according to these embodiments, to form an erosion shield. The sheet/foil of the first thermoplastic material may be placed in the mould together with fibre material. The sheet/foil may be flexible enough to follow the contour of the mould surface, especially when subjected to the weight of fibre plies or pre-preg material placed on top of the sheet/foil of first thermoplastic material. The vacuum applied when resin is injected may also help to fix the sheet/foil of first thermoplastic material in the mould.

After moulding of the shell body, now comprising the first thermoplastic material exposed to the outer surface of the shell at the leading edge, the sheet/foil of the second thermoplastic material is attached on top of the first thermoplastic material. By choosing suitable thermoplastic materials, as explained above, it may be possible to attach the second thermoplastic material by plastic welding, such as laser welding.

In a service situation, where the second thermoplastic material has been eroded from the erosion shield of the wind turbine blade, exposing the first thermoplastic material at the outer surface of the leading edge of the blade, the repair of the erosion shield may be done on-site by welding a new sheet/foil of the second thermoplastic material to the first thermoplastic material. If, for example, laser welding is used, the attachment process is more or less independent of the environmental conditions at the site of repair (temperature, humidity etc.).

The repair can of course be performed with pre-formed parts of the second thermoplastic material as well.

Figure 10:
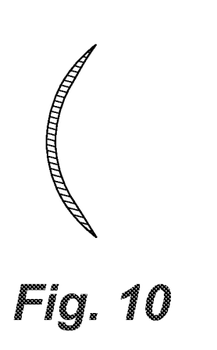
FIG. 10 shows a schematic view of a pre-formed part of thermoplastic material, the part being thinner at the ends than in the middle.

FIG. 10 shows a schematic view of a pre-formed part of thermoplastic material, the part being thinner at the ends than in the middle. Such a part may be advantageous if no recess is available at the leading edge. A first such part of the first thermoplastic material may be integrated in the shell body of the blade in the moulding process, as previously explained, and a second such part of the second thermoplastic material may be attached to the first part after moulding. The geometry having the thinner ends allows the resulting erosion shield to be substantially flush with the surface of the airfoil, even without a recess in the shell body, whereby aerodynamic disturbances from the erosion shield may be minimized.

Figure 11:
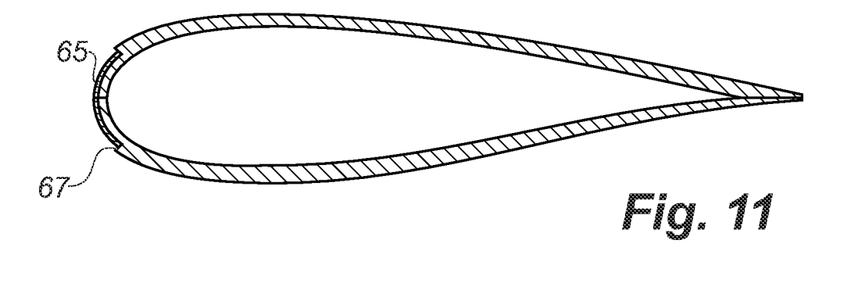
FIG. 11 shows a schematic view of an airfoil profile corresponding to the joining of the two shell body parts of FIG. 5.

FIG. 11 shows a schematic view of an airfoil profile corresponding to the joining of the two shell body parts of FIG. 5.

The recess 67 at the leading edge may accommodate a second thermoplastic material (not shown) on top of the shown integrated first thermoplastic material 65 and attached to the first thermoplastic material 65, for example by plastic welding. The second thermoplastic material may be in the form of a sheet or foil as shown in FIG. 9 or a pre-formed part as shown in FIG. 8.

It may also be possible to attach a pre-formed sandwich part (see FIG. 7) already comprising a layer of a first—and a layer of a second thermoplastic material to the thermoplastic material in the recess, whereby a three-layer erosion shield may be formed.

Figure 12:
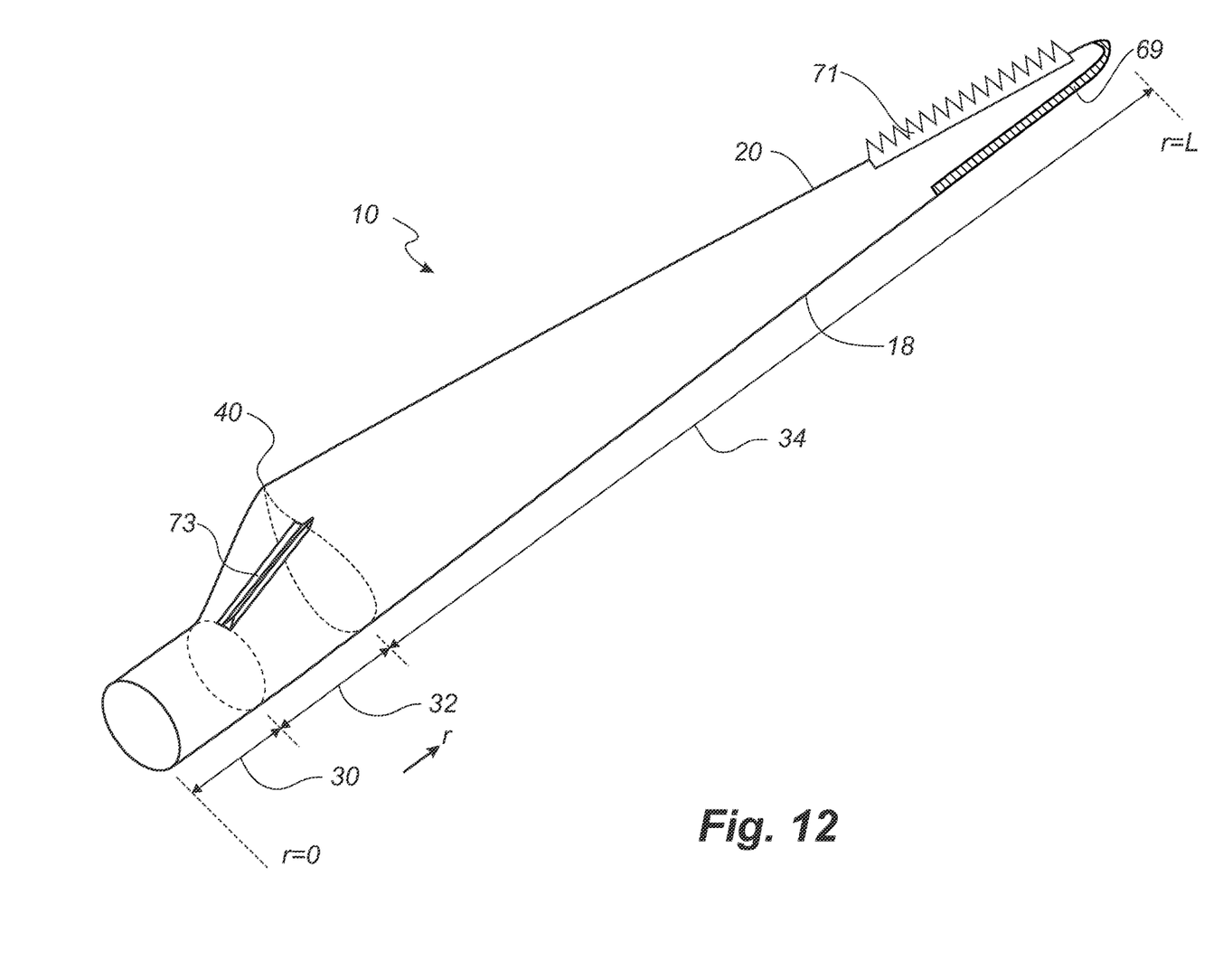
FIG. 12 shows a schematic view of a wind turbine blade with an erosion shield, serrations and a spoiler attached to the blade of FIG. 2 at the anchoring sites indicated.

FIG. 12 shows a schematic view of a wind turbine blade with an erosion shield 69, and further surface mounted devices, serrations 71 and a spoiler 73, attached to the blade of FIG. 2 at the sites for attachment shown in FIG. 2. Attaching such add-ons or surface mounted devices via the sites of attachment integrated in the shell body may be performed by using adhesive. The adhesive may be chosen to provide better bond strength than can be achieved by gluing surface mounted devices to the shell body without having the dedicated sites for attachment. Preferably other methods of attachment may be used, such as plastic welding. It is only possible to use plastic welding if both the sites of attachment and the surface mounted devices are made of thermoplastic material. Due to the integration of the anchoring sites for attachment in the shell body, a superior attachment of the surface mounted devices may be achieved when compared to attaching surface mounted devices directly to the fibre reinforced material of a shell body for a wind turbine blade, for example, by using double-sided tape, because the material used for providing the anchoring site may be selected for optimal bonding, while fibre reinforced material typically is selected to provide stiffness and to resist stresses induced in the blade when subjected to different forces during rotation when mounted on the wind turbine.

Accordingly, any add-ons suitable for attachment to thermoplastic sites of attachment may be used according to embodiments of the invention. Vortex generators (not shown), for example, may be made of thermoplastic material and attached to suitably placed sites of attachment.

LIST OF REFERENCE NUMERALS 2 wind turbine
4 tower
6 nacelle
8 hub
10 blade
14 blade tip
16 blade root 18 leading edge
20 trailing edge
22 pitch axis
30 root region
32 transition region
34 airfoil region
41 first airfoil profile
42 second airfoil profile
43 third airfoil profile
44 fourth airfoil profile
45 fifth airfoil profile
46 sixth airfoil profile
50 airfoil profile
52 pressure side
54 suction side
56 leading edge
58 trailing edge
60 chord
61 thermoplastic anchoring site in transition region
62 camber line/median line
63 thermoplastic anchoring site at trailing edge
64 first erosion shield
65 a first thermoplastic material
66 a second thermoplastic material
67 recess
68 thermoplastic anchoring site at leading edge
69 second erosion shield
71 surface mounted device, serrations
73 surface mounted device, spoiler
c chord length
dt position of maximum thickness
df position of maximum camber
dp position of maximum pressure side camber
f camber
L blade length
P power output
r local radius, radial distance from blade root
t thickness
vw wind speed
☐ twist, pitch
Δy prebend

The invention claimed is:

1. A method of manufacturing a wind turbine blade, comprising the steps of:
   placing a first thermoplastic material in a mould for moulding at least a part of a blade shell body of the wind turbine blade, wherein the first thermoplastic material forms at least part of a leading edge of an outer surface of the wind turbine blade;
   placing reinforcement fibres in the mould;
   contacting the first thermoplastic material and the reinforcement fibres with thermosetting resin;
   curing said resin to form at least a part of the blade shell body, the blade shell body comprising a composite material of the reinforcement fibres and the thermosetting resin, wherein the first thermoplastic material forms an inner layer of an erosion shield of the wind turbine blade; and
   following the moulding of the at least a part of the blade shell body and the curing of the resin, attaching to said first thermoplastic material a second thermoplastic material, the second thermoplastic material forming an outer layer of the erosion shield, wherein the erosion shield extends along at least a part of the leading edge of the outer surface of the wind turbine blade, the first thermoplastic material of the inner layer of the erosion shield being an integral part of the blade shell body.

2. A method of manufacturing a wind turbine blade, comprising the steps of:
   placing a first thermoplastic material in a mould for moulding at least a part of a blade shell body of the wind turbine blade, wherein the first thermoplastic material forms at least part of a leading edge of an outer surface of the wind turbine blade;
   placing reinforcement fibres in the mould;
   contacting the first thermoplastic material and the reinforcement fibres with thermosetting resin;
   curing said resin to form at least a part of the blade shell body, the blade shell body comprising a composite material of the reinforcement fibres and the thermosetting resin, wherein the first thermoplastic material forms an inner layer of an erosion shield of the wind turbine blade; and
   following the moulding of the at least a part of the blade shell body and the curing of the resin, attaching to said first thermoplastic material a second thermoplastic material by plastic welding, the second thermoplastic material forming an outer layer of the erosion shield, wherein the erosion shield extends along at least a part of the leading edge of the outer surface of the wind turbine blade, the first thermoplastic material of the inner layer of the erosion shield being an integral part of the blade shell body.

* * * * *